United States Patent
Bonilla et al.

(10) Patent No.: US 7,315,437 B2
(45) Date of Patent: Jan. 1, 2008

(54) SELF TESTING GROUND FAULT CIRCUIT INTERRUPTER (GFCI) WITH END OF LIFE (EOL) INDICATOR, SECONDARY POWER SUPPLY FOR EOL AND SELF TEST CIRCUITRY, AND DEVICE FOR OPENING LINE HOT WHEN EOL OCCURS

(75) Inventors: Nelson Bonilla, West Haven, CT (US); John R. Baldwin, Newtown, CT (US); Robert Fanzutti, Naugatuck, CT (US); Daming Yu, Easton, CT (US); Thomas Batko, Wallingford, CT (US); Robert Youle, Naugatuck, CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 11/443,435

(22) Filed: May 31, 2006

(65) Prior Publication Data

US 2007/0279814 A1    Dec. 6, 2007

(51) Int. Cl.
*H02H 3/00* (2006.01)
(52) U.S. Cl. ....................................... 361/42
(58) Field of Classification Search ................ 361/42
See application file for complete search history.

(56) References Cited

U.S. PATENT DOCUMENTS

| | | |
|---|---|---|
| 3,932,790 A | 1/1976 | Muchnick |
| 4,063,299 A | 12/1977 | Munroe |
| 4,574,324 A | 3/1986 | Packard |
| 5,363,269 A | 11/1994 | McDonald |
| 5,418,678 A | 5/1995 | McDonald |
| 5,661,623 A | 8/1997 | McDonald et al. |
| 5,894,392 A | 4/1999 | McDonald |
| 5,963,408 A | 10/1999 | Neiger et al. |
| 6,052,265 A * | 4/2000 | Zaretsky et al. .............. 361/42 |
| 6,128,169 A | 10/2000 | Neiger et al. |
| 6,262,871 B1 | 7/2001 | Nemir et al. |
| 6,807,036 B2 | 10/2004 | Baldwin |
| 6,873,158 B2 | 3/2005 | Macbeth |
| 6,952,150 B2 | 10/2005 | Radosavljevic et al. |
| 6,958,895 B1 | 10/2005 | Radosavljevic et al. |
| 6,980,005 B2 | 12/2005 | Finlay, Sr. et al. |
| 2002/0053440 A1* | 5/2002 | Gil ................................ 169/37 |
| 2002/0126433 A1* | 9/2002 | Hoopes ...................... 361/103 |
| 2002/0181175 A1 | 12/2002 | Baldwin |
| 2004/0156160 A1* | 8/2004 | Choo .......................... 361/118 |
| 2005/0063109 A1 | 3/2005 | Baldwin |
| 2005/0270805 A1* | 12/2005 | Yasumura .................... 363/16 |

* cited by examiner

*Primary Examiner*—Michael Sherry
*Assistant Examiner*—Ann Hoang
(74) *Attorney, Agent, or Firm*—Stacey J. Longanecker; Mark S. Bicks; Alfred N. Goodman

(57) ABSTRACT

A self test (ST) ground fault circuit interrupter (GFCI) provides a half wave rectifier for powering circuitry for determining and annunciating end of life (EOL) of the GFCI regardless of a shorted diode bridge or opening of a printed circuit board (PCB) trace. A fuse resistor is provided to open before an open PCB trace can occur. A microprocessor-controlled heat-conducting circuit is provided adjacent to a thermal fuse to controllably open the thermal fuse and remove power from face receptacle contacts and load terminals when EOL occurs.

16 Claims, 8 Drawing Sheets

TO FIG. 3B

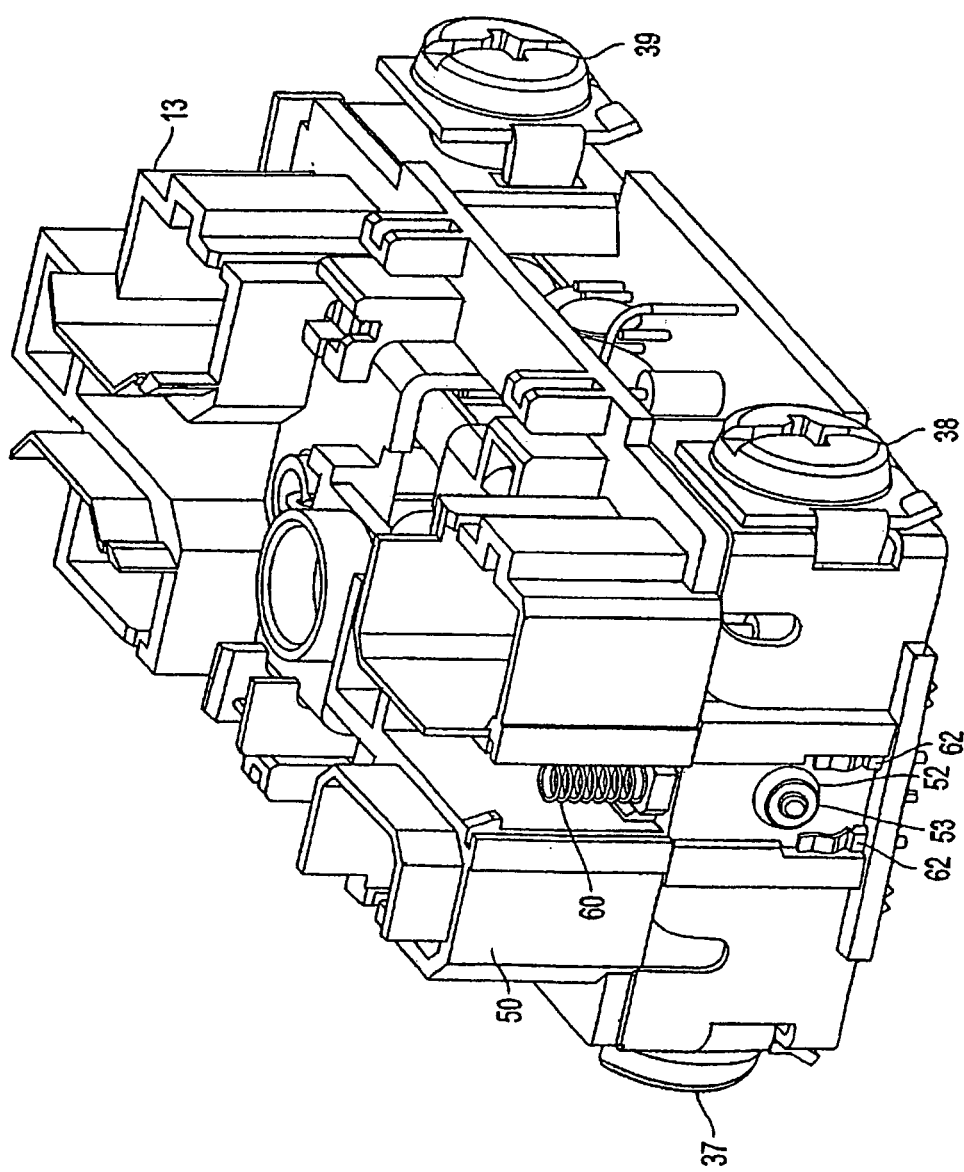

SELF TESTING GROUND FAULT CIRCUIT INTERRUPTER (GFCI) WITH END OF LIFE (EOL) INDICATOR, SECONDARY POWER SUPPLY FOR EOL AND SELF TEST CIRCUITRY, AND DEVICE FOR OPENING LINE HOT WHEN EOL OCCURS

CROSS-REFERENCE TO RELATED APPLICATIONS

Related subject matter is disclosed in U.S. Non-provisional Patent entitled "SELF TESTING GROUND FAULT CIRCUIT INTERRUPTER (GFCI)", filed on Dec. 16, 2004, and assigned Ser. No. 11/000,531, U.S. Non-provisional Patent Application entitled "SELF TESTING GROUND FAULT CIRCUIT INTERRUPTER (GFCI) WITH END OF LIFE (EOL) DETECTION THAT REJECTS FALSE EOL INFORMATION", filed on Aug. 8, 2005, and assigned Ser. No. 11/198,400, and U.S. Non-provisional Patent Application entitled "GROUND FAULT CIRCUIT INTERRUPTER (GFCI) END-OF-LIFE (EOL) STATUS INDICATOR", filed on Aug. 8, 2005, and assigned Ser. No. 11/198,388, the entire contents of said applications being incorporated herein by reference.

FIELD OF THE INVENTION

The present invention relates generally to a self testing fault interrupting device, such as a ground fault circuit interrupter (GFCI). More particularly, the present invention relates to an improved self testing fault interrupting device that provides end-of-life (EOL) detection and annunciation in the event of a shorted power supply diode bridge, and a device for removing power from the GFCI face receptacle contacts and load terminals when EOL occurs.

BACKGROUND OF THE INVENTION

Fault interrupting devices are designed to trip in response to the detection of a fault condition at an AC load. The fault condition can result when a person comes into contact with the hot side of the AC load and an earth ground, a situation that can result in serious injury. A ground fault circuit interrupter (GFCI) detects this condition by using a sense transformer to detect an imbalance between the currents flowing in the line and neutral conductors of the AC supply, as will occur when some of the current on the load hot side is being diverted to ground. When such an imbalance is detected, a relay or circuit breaker within the GFCI device is immediately tripped to an open condition, thereby removing all power from the load.

Many types of GFCI devices are also capable of being tripped not only by contact between the line side of the AC load and ground, but also by a connection between the neutral side of the AC load and ground. The latter type of connection, which may result from a defective load or from improper wiring, is potentially dangerous because it can prevent a conventional GFCI device from tripping at the required threshold level of differential current when a line-to-ground fault occurs.

Most GFCI devices provide some form of manual and/or self test operation to allow a user to insure the integrity of the GFCI protection device. For a manual test on a GFCI protection device, the user is required to press a test button which simulates a ground fault condition in a GFCI protection device, resulting in the contacts of the GFCI protection device opening. Existing self testing fault protection devices have been provided which have a self test function to obviate a user having to perform manual tests at various intervals of time (e.g., weekly, monthly, and so on). Many GFCI devices employ a GFCI integrated circuit or chip in the sensing circuit that processes data received from the sensing transformers and provides an output or trip signal that can be used to activate a gated device such as an SCR and energize a solenoid and open the contacts. A microprocessor, in turn, monitors outputs from the GFCI chip and SCR, among other components. As described in the above-referenced application Ser. No. 11/000,531, self-testing can be performed to test the integrity and operation of the GFCI integrated circuit (IC) or chip, the SCR and the solenoid without having to open the contacts and interrupt power to the load. The self test circuitry also comprises an indicator such as a light emitting diode (LED) for annunciating end of life (EOL) when the self test determines that the GFCI is no longer working effectively (e.g., the GFCI chip, the SCR or the solenoid are nonfunctional)

In existing GFCIs, a four diode bridge is generally used to supply power to the GFCI's components and, in particular, to both the GFCI chip and its associated circuitry (e.g., microcontroller, SCR and solenoid) and the self test circuitry. When the bridge shorts, a printed circuit board track can open, thereby removing power from both the core GFCI circuitry and the self test circuitry. Accordingly, no EOL indication is possible. A need therefore exists for a way to provide power to the self test circuitry when a PCB track opens as a result of a shorted bridge diode.

GFCI devices may be connected to fuse boxes or circuit breaker panels to provide central protection for the AC wiring throughout a commercial or residential structure. More commonly, however, GFCI devices are incorporated into electrical receptacles that are designed for installation at various locations within a building. A typical receptacle configuration is shown, for example, in U.S. Pat. No. 4,568,997, to Bienwald et al., the entire content of which is incorporated herein by reference.

A need also exists for a means to remove power from the face receptacle contacts and the load terminals when EOL occurs.

SUMMARY OF THE INVENTION

The above disadvantages and other objectives are substantially achieved by a system and method employing a ground fault circuit interrupter (GFCI) device in accordance with the principles of the present invention. The method and GFCI device comprise a power path for the microprocessor and associated self-test circuitry (e.g., EOL indicator) that is separate from and independent of the full wave rectified power path provided to the GFCI and associated circuitry via a diode bridge.

In accordance with another aspect of the present invention, a secondary power path for the self test circuitry comprises a half wave rectifying diode in a conductive path extending from the hot conductor to a voltage regulator. An EOL indicator is connected serially to the conductive path. The voltage regulator provides power to a microprocessor and associated self test circuitry for determining GFCI device malfunctioning and indicating EOL even in the event of a shorted diode bridge and opening of a PCB trace.

In one exemplary embodiment of the present invention, a fuse resistor is provided between the hot conductor and the diode bridge to avoid PCB trace opening.

In another exemplary embodiment of the present invention, a thermal fuse and adjacent microprocessor-controlled heat-conducting device are provided to controllably remove power from the face receptacle contacts and the load terminals. Upon application of a voltage across the heat-conducting device by the microprocessor, the surface temperature of the heat-conducting device increases and thereby increases the surface temperature of the thermal fuse to a temperature at which the thermal fuse opens when the processing device determines EOL of the fault detector.

BRIEF DESCRIPTION OF THE DRAWINGS

These and other aspects, advantages and novel features of the invention will be more readily appreciated from the following detailed description when read in conjunction with the accompanying drawings, in which:

FIGS. 4-6 are perspective views illustrating the operation of a miswire plate of the ground fault circuit interrupting device shown in FIG. 1 in accordance with an exemplary embodiment of the present invention.

Throughout the claims, like reference numbers should be understood to refer to like elements, features and structures.

DETAILED DESCRIPTION OF THE EXEMPLARY EMBODIMENTS

Figure 1:
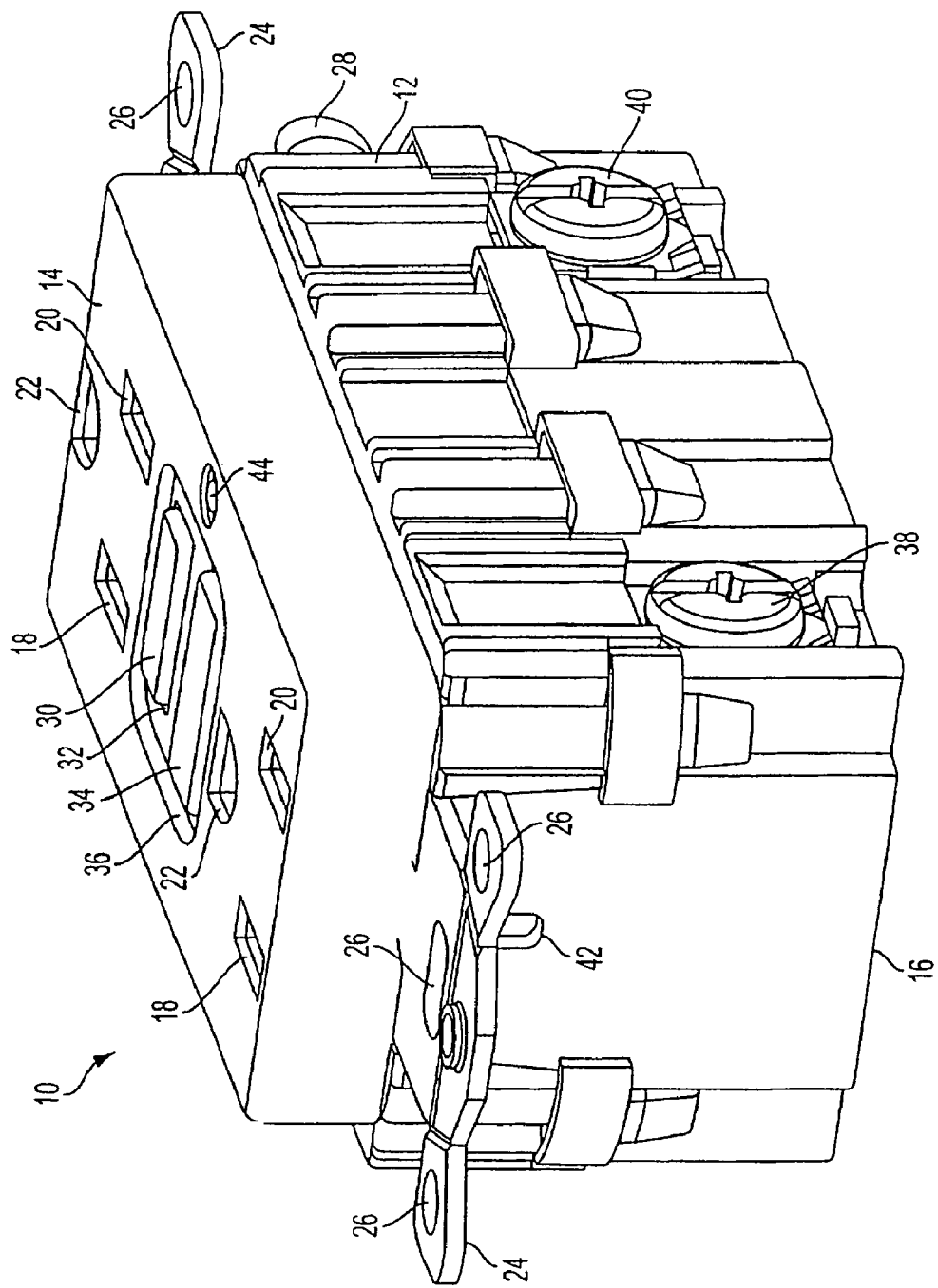
FIG. 1 is a perspective view of an example of a ground fault circuit interrupting (GFCI) device in accordance with an exemplary embodiment of the present invention.

FIG. 1 is a perspective view of an example of a ground fault circuit interrupting (GFCI) device 10 in accordance with an embodiment of the present invention. The GFCI device 10 comprises a housing 12 having a cover portion 14 and a rear portion 16. The GFCI also includes an inner housing (not shown) when the cover portion 14 is removed from the rear portion 16. The cover portion 14 and rear portion 16 are removably secured to each other via fastening means such as clips, screws, brackets, tabs and the like. The cover portion includes plugin slots (also known as face receptacles) 18 and 20 and grounding slots 22. It should be appreciated by those skilled in the art that plugin slots 18 and 20 and grounding slots 22 can accommodate polarized, non-polarized, grounded or non-grounded blades of a male plug. The male plug can be a two wire or three wire plug without departing from the scope of the embodiment of the present invention.

The GFCI receptacle 10 further includes mounting strap 24 having mounting holes 26 for mounting the GFCI receptacle 10 to a junction box (not shown). At the rear wall of the housing 12 is a grounding screw 28 for connecting a ground conductor (not shown).

A test button 30 extends through opening 32 in the cover portion 14 of the housing 12. The test button is used to activate a test operation that tests the operation of the circuit interrupting portion disposed in the GFCI receptacle 10. The circuit interrupting portion, to be described in more detail below, is used to break electrical continuity in one or more conductive paths between the line and load side of the GFCI receptacle 10. A reset button 34 extends through opening 36 in the cover portion 14 of the housing 12. The reset button 34 is used to activate a reset operation, which reestablishes electrical continuity in the open conductive paths.

Figure 2:
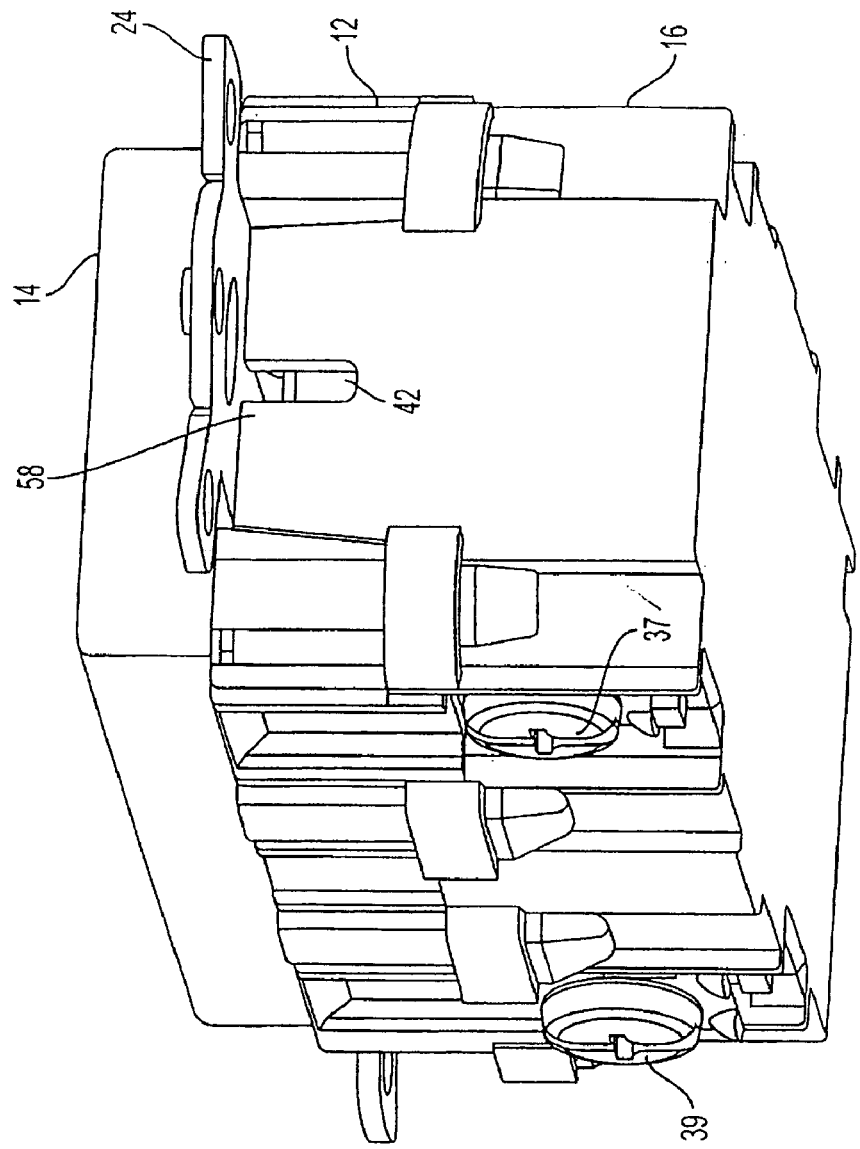
FIG. 2 is another perspective view of the ground fault interrupting device shown in FIG. 1 in accordance with an exemplary embodiment of the present invention.

Rear portion 16 preferably includes four screws, only two of which are shown in FIG. 1. Load terminal screw 38 is connected to a neutral conductor and an opposing load terminal screw 37 (See FIG. 2) is connected to the hot conductor. Line terminal screw 40 is connected to the neutral conductor and an opposing line terminal screw 39 (See FIG. 2) is connected to the hot conductor. It should be appreciated by those skilled in the art that the GFCI receptacle 10 can also include apertures proximate the line and load terminal screws 37, 38, 39 and 40 to receive the bare end of conductors rather than connecting the bare end of the wires to the line and load terminal screws.

Alarm indicator 44 preferably comprises a dual color lamp which provides a first color when a first filament is activated and a second color when a second filament is activated. The alarm indicator 44A can illuminate to provide a green color when the GFCI receptacle 10 is operating normally and providing GFCI protection. Alternatively, the alarm indicator 44B illuminates to provide a flashing red color when the GFCI receptacle 10 is operating as a normal receptacle and not providing ground fault protection indicating a detected fault in the GFCI mechanism or electronics. Specifically, alarm indicator 44B flashes when any portion of the self test fails or fails a coil test. In another alternate configuration, alarm indicator 44B can illuminate steady to indicate that a ground fault was detected. It should be appreciated by those skilled in the art that although the alarm indicator is described as being a dual filament lamp, two separate single filament lamps, a single lamp having a single filament, or a buzzer, or any other suitable indicator such as a colored lamp can be used to provide an alarm indication without departing from the scope of the present invention.

Figure 3A:
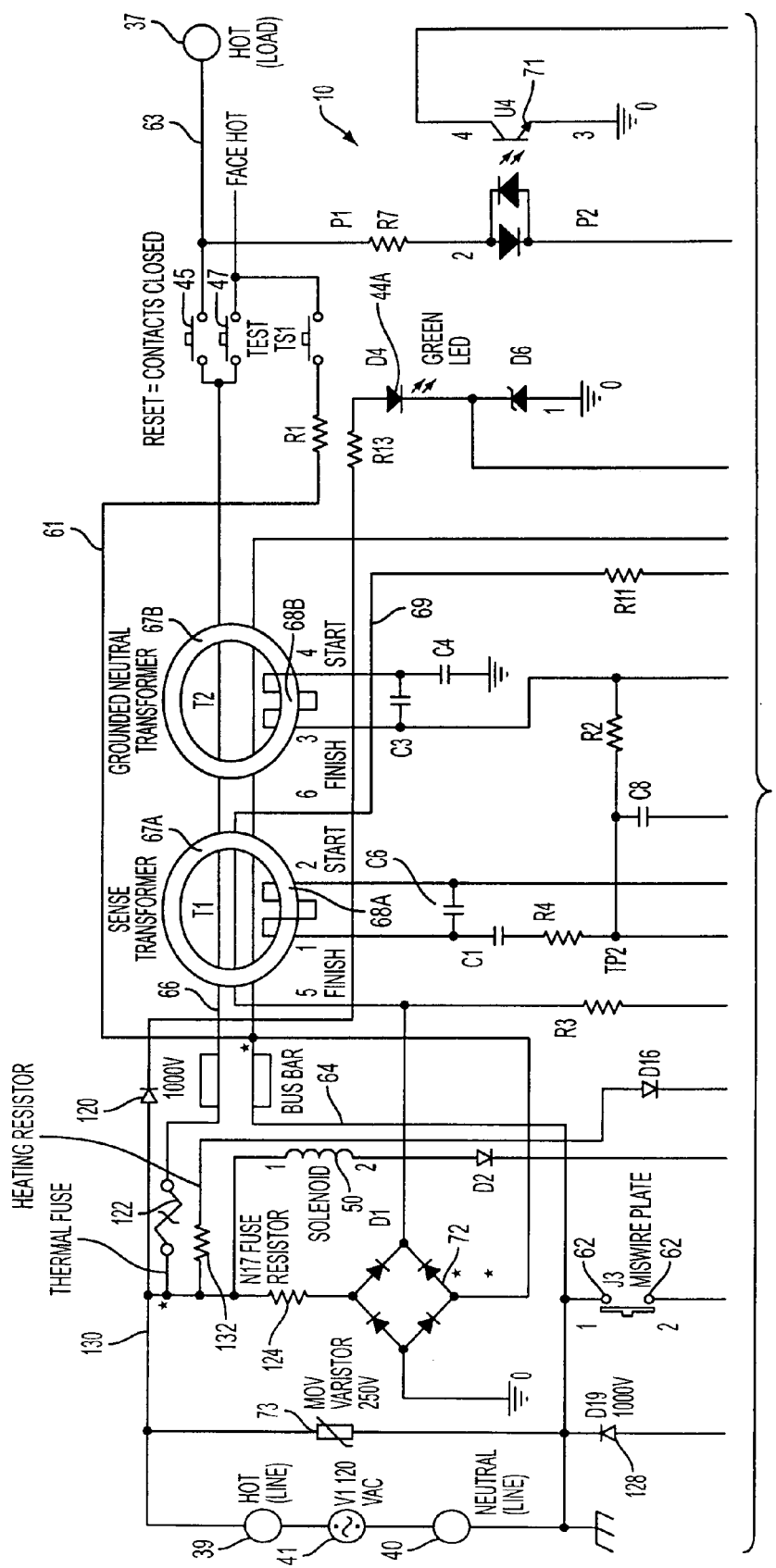
FIG. 3 is a schematic diagram of a ground fault circuit interrupter in accordance with an exemplary embodiment of the present invention, in which a conventional GFCI chip is employed in combination with a microprocessor to operate the GFCI.
Figure 3B:
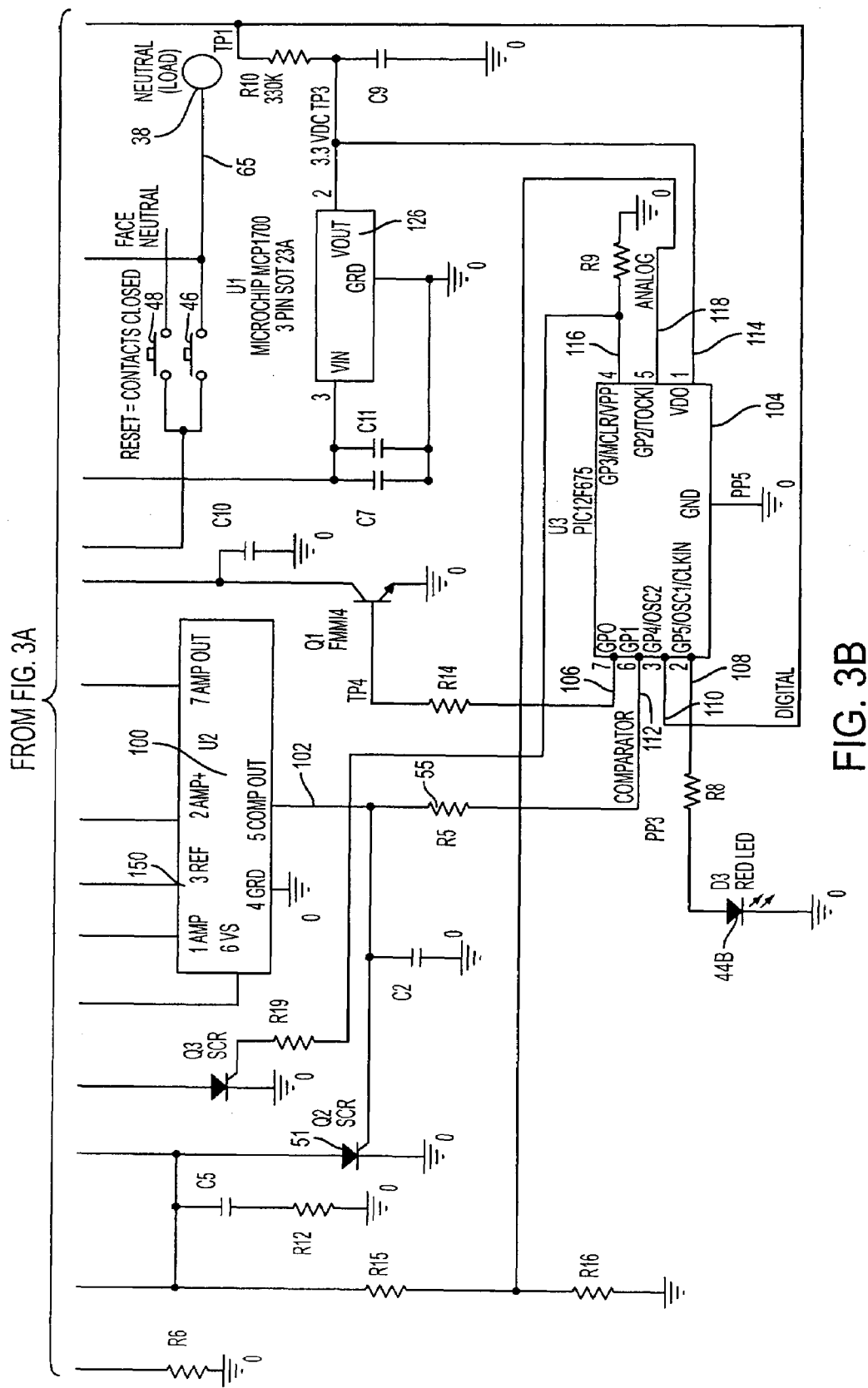
Figure 5:
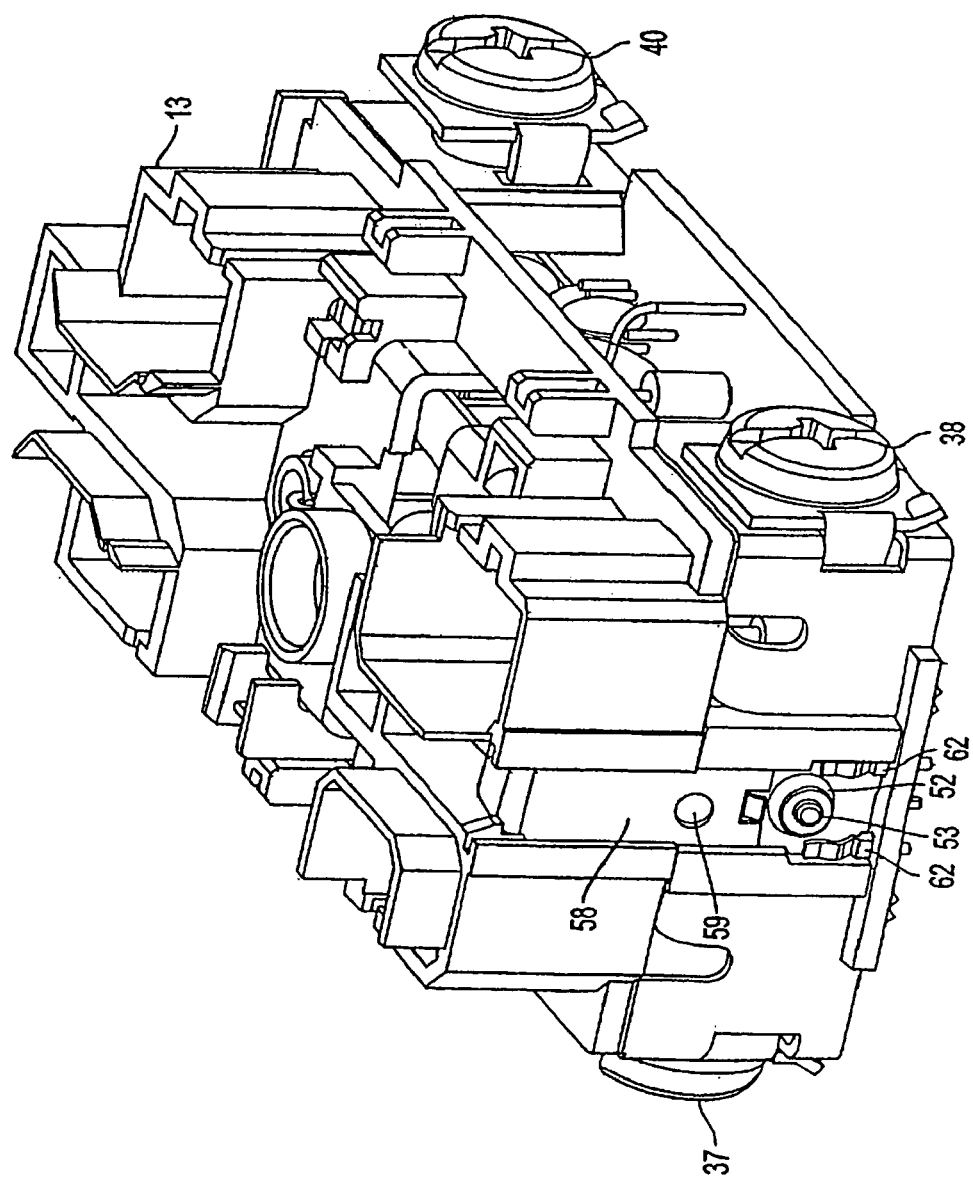
Figure 6:
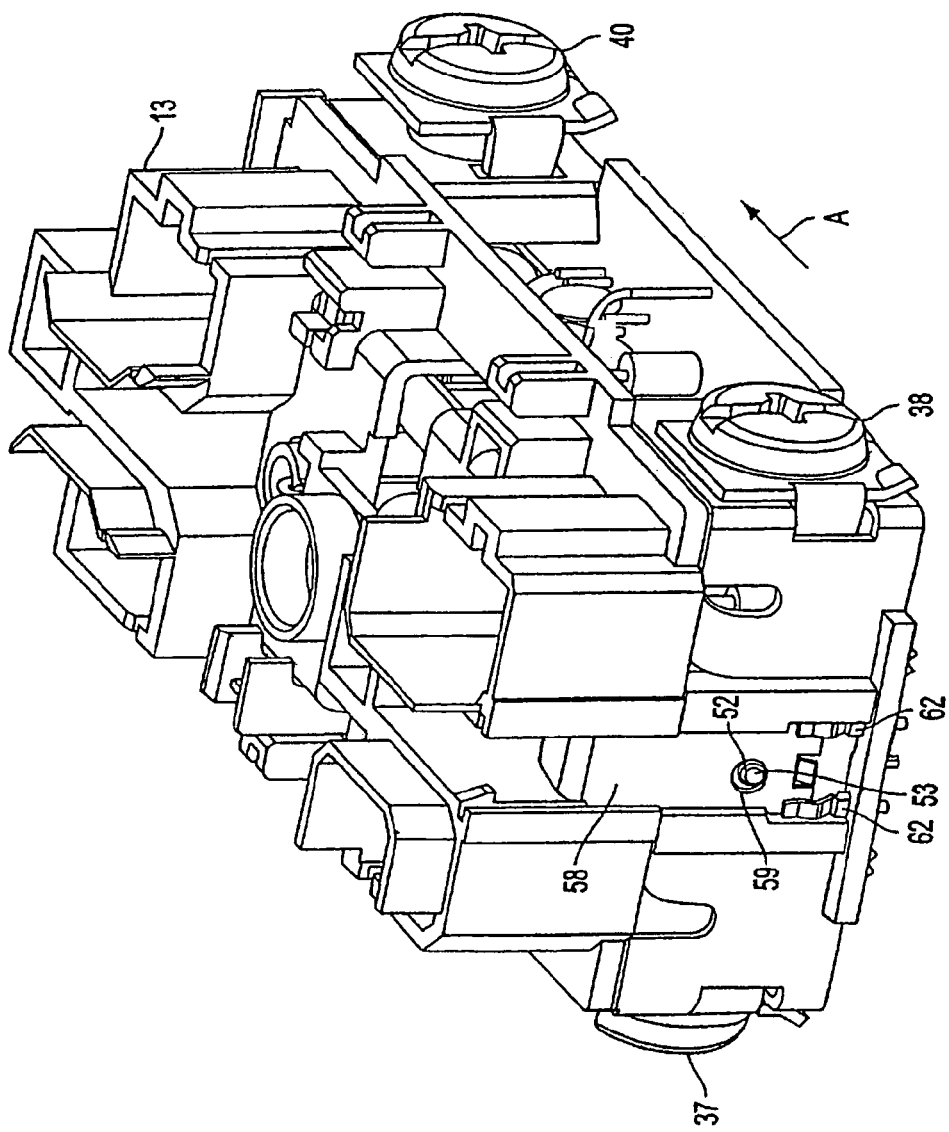

FIG. 3 is a schematic diagram illustrating an example of the circuitry of the ground fault circuit interrupting device of FIG. 1 in accordance with an embodiment of the present invention. In accordance with this embodiment, the GFCI device 10 is provided with a contacts 45, 46, 47, 48, a sensing circuit comprising a GFCI chip 100 and a transformer arrangement comprising sensing transformer 68A and ground transformer 68B, solenoid 50, and a microprocessor 104. With reference to FIGS. 4-7, the GFCI device 10 further comprises a solenoid plunger 52, latching plate 54, reset pin 56, miswire plate 58, locking spring 60, secondary contacts 62, neutral conductor 64, and hot conductor 66

GFCI device 10 is structured and arranged to prevent an initial miswiring of the GFCI. That is, as described in more detail below, prior to shipping the device for use, the miswire plate 58 is pressed downward to engage a projection 53 on the back of plunger 52 and makes contact with secondary contacts 62 to thus close the secondary contacts 62. In the GFCI device's initial configuration, the reset pin 56, when depressed, cannot engage the latching plate 54 because the latching plate 54 is displaced by the solenoid plunger 52 and the miswire plate 58, such that aperture 55 is aligned with reset pin 56. When the GFCI receptacle 10 is connected to the line side, the secondary contacts power the solenoid 50, causing solenoid plunger 52 to release miswire plate 58 and position latching plate 54 so that the reset pin 56 can engage with the edge of the latching plate 54 when the reset button 34 is depressed.

Figure 7:
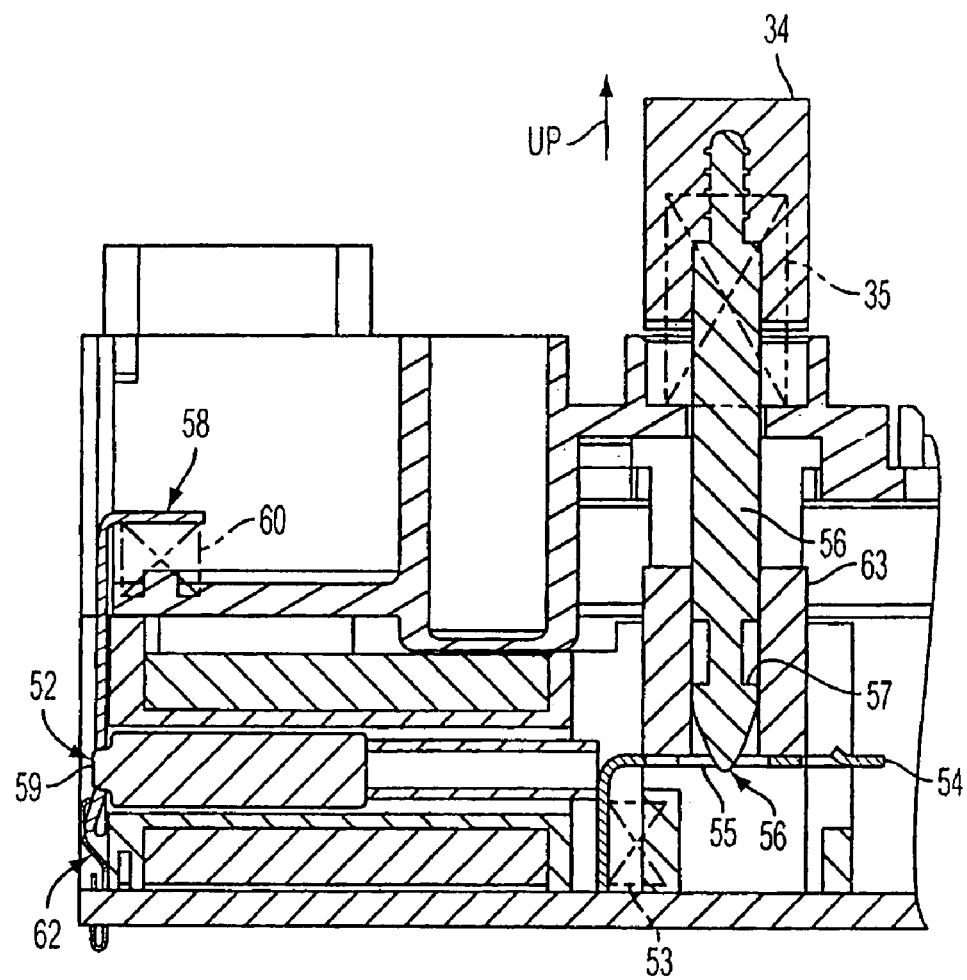
FIG. 7 is a cross sectional view illustrating an exemplary position of the miswire plate, a latching plate and a reset pin of the ground fault circuit interrupting device of FIG. 1 in accordance with an exemplary embodiment of the present invention.

FIG. 7 is a cross-sectional view illustrating an example of positions of the miswire plate 58, a latching plate 54 and a reset pin 56 in accordance with an embodiment of the present invention. In FIG. 7, the miswire plate 58 is shown as being engaged with the projection 53 of the plunger 52 via the aperture 59. The miswire plate 58 makes contact with secondary contacts 62, thus closing them. Locking spring 60 is compressed and exerts pressure against the miswire plate 58, but cannot move miswire plate 58 upwards because miswire plate 58 is held in place by projection 53 of solenoid plunger 52. In addition, latching plate 54 is positioned to prevent the reset pin 56 from engaging with the latching plate 54. That is, the latching plate 54 is positioned to allow the reset pin 56 to freely pass through the latching plate 54 when the reset button is depressed without engaging with the latching plate 54.

After power is applied to the line side of the device, the secondary contacts 62 are closed, thus power is applied to the solenoid 50, which drives the plunger 52 forward. This releases the projection 53 of the plunger 52 from the aperture 59 of the miswire plate 58, and also pushes the plunger 52 against the latching plate 54 to position the aperture 55 slightly out of alignment with the reset pin 56. The locking spring 60 urges the miswire plate 58 upward, thus forcing the miswire plate 58 into an extended or non-contacting position. The secondary contacts 62 open and remove power from the solenoid 50.

GFCI receptacle 10 can have the miswire plate 58 in a non-engaged state and the latching plate 54 in an engagement position. Specifically, solenoid plunger 52 can move in an outwardly lateral direction. That is, the latch spring 53 pushes latch plate 54 and solenoid plunger 52 in the lateral direction. Because the solenoid plunger 52 can move further, latching plate 54 can move to an engagement position, such that reset pin 56 engages an edge of aperture 55 in the latching plate 54 when depressed. The GFCI receptacle is now able to provide ground fault protection.

Referring now to FIG. 3 and the operation of the GFCI receptacle 10 in a ground fault state, FIG. 3 is a schematic diagram of a ground fault circuit interrupter in accordance with an embodiment of the present invention, in which a conventional GFCI chip 100 is employed in combination with a microprocessor 104 to operate the GFCI receptacle 10. The GFCI receptacle 10 employs a GFCI chip 100 with an output 102 connected to a pin 112 of the microprocessor 104. The microprocessor 104 is preferably a Type PIC12F629 or PIC12F675 microprocessor manufactured by Microchip, located in Chandler, Ariz.

The GFCI device 10 employs two sets of contacts, namely contacts primary hot and neutral contacts 45 and 46 and face hot and neutral contacts 47 and 48. Contact 45 establishes electrical continuity between line terminal 39 and load terminal 37 via hot conductor 66. Contact 46 establishes electrical continuity between line terminal 40 and load terminal 38 via neutral conductor 65. Face contacts 47 and 48 establish electrical continuity between the line terminals 39 and 40 and face terminals 18 and 20 via hot conductor 66 and neutral conductor 64, respectively. The isolation of face contacts 47 and 48 from the load terminals 37 and 38 prevent the face terminals 18 and 20 from being powered if the GFCI device 10 is mistakenly wired so that power source 41 is connected to the load terminals 37 and 38. It should be noted that GFCI device 10 is structured and arranged to permit the electronics of the circuit to be powered only when the GFCI device 10 is wired from the line terminals 39 and 40 via a power source. If a power source 41 is connected to the load terminals 37 and 38, the electronics of the GFCI device 10 cannot be powered, and the miswire plate 58 cannot be released in order to close contacts 45, 46, 47 and 48, which are mechanically closed by the reset button 34. Before initial power is applied contacts 45, 46, 47 and 48 are open. The microprocessor 104 detects an output from the optocoupler 71 only when contacts 45 and 46 are closed, which can only occur after the GFCI device has been properly connected on the line side (that is, after the miswire plate 58 has been closed).

The detection of a ground fault condition at a load, which is connected to one of the face receptacles 18, 20 or to the load terminals 37 and 38, is implemented by a current sense transformer 68A, and the GFCI chip 100 as well as other interconnecting components. The GFCI chip 100 is preferably a Type RV4145AM integrated circuit available from Fairchild Semiconductor, located in South Portland, Me. The GFCI chip 100 and the microprocessor 104 are powered from the line terminals 39 and 40 by a full-wave bridge rectifier 72. A transient voltage suppressor 73 is preferably connected across the line terminals 39 and 40 to provide protection from voltage surges due to lightning and other transient conditions. As the transients increase, the voltage suppressor 73 absorbs energy.

Within the GFCI receptacle 10, the hot conductors 66 and 67, as mentioned above, connect the line terminal 39 to the load line terminal 37, and neutral conductors 64 and 65 connect the line terminal 40 to the load terminal 38, in a conventional manner when contacts 45 and 46 are closed. The conductors 66 and 64 pass through the magnetic cores 67A and 67B of the two transformers 68A and 68B, respectively. The transformer 68A serves as a differential sense transformer for detecting a leakage path between the line side of the AC load and an earth ground (not shown), while the transformer 68B serves as a grounded neutral transformer for detecting a leakage path between the neutral side of the AC load and an earth ground. In the absence of a ground fault, the current flowing through the conductors 64 and 66 are equal and opposite, and no net flux is generated in the core 67A of the differential sense transformer 68A. In the event that a connection occurs between the line side of the AC load and ground, however, the current flowing through the conductors 64 and 66 no longer precisely cancel, and a net flux is generated in the core 67A of the differential sense transformer 68A. This flux gives rise to a potential at the output of the sense transformer 68A, and this output is applied to the input 150 of the GFCI chip 100 to produce a trip signal on the output line 102. The trip signal pulses the SCR's 51 gate, and is also detected via pin 112 of the microprocessor 104. The solenoid 50 is energized via the conducting SCR 51, which opens primary hot contact 45 and neutral contact 46 and face hot contact 47 and face neutral contact 48. Specifically, when the solenoid 50 is energized, the solenoid 50 moves the plunger 52 which moves the latching plate 54, thus, freeing the reset pin 56 and opening the contacts 45, 46, 47 and 48. The optocoupler 71 outputs a signal which is detected by the microprocessor 104 via pin 110. If the optocoupler's 71 signal is high, it indicates that primary hot contact 45 and primary neutral contact 46 are open. If the optocoupler's 71 signal is low, it indicates that both the primary hot contact 45 and primary neutral contact 46 are closed Primary hot contact 45 and neutral contact 46 and face hot contact 47 and face neutral contact 48 are in a closed state when the reset button 34 has been pressed and the solenoid 50 is deenergized. This state will be referred to as the normal state or closed state. However, after the solenoid 101 has been energized, the contacts 45, 46, 47 and 48 open. This state will be referred to as an open state.

In operation, a ground fault can occur via a manual or self-test, or an actual ground fault, for example when a person comes into contact with the line side of the AC load and an earth ground at the same time. In a manual test, a user presses test button 30. Test button 30 is connected between the hot conductor 66 and neutral conductor 64, which is a path that bypasses sense transformer 68A and ground transformer 68B. When the test button 30 is pressed, an imbalance is detected by sense transformer 68A because a path is established outside of the transformers 68A and 68B. Since there is no canceling current in the opposite direction, sense transformer 68A detects the current imbalance. As discussed above, the GFCI chip 100 detects a fault condition via transformers 68A and 68B. GFCI chip 100 communicates the fault condition via a trip signal on pin 102 to the microprocessor 104 via pin 112. Since the microprocessor 104 has no way of knowing whether a ground fault was triggered by an actual fault or by a manual fault simulated by pressing test button 30, the microprocessor 104 always reacts as if an actual fault condition has occurred.

The microprocessor 104 also does not know whether the actual fault has been removed until a user presses the reset button 34. If the fault is still present, the transformers 68A and 68B will detect the condition and GFCI chip 100 will reopen the contacts immediately as discussed above. If a manual test was performed, the fault will no longer be present and the GFCI device 10 returns to normal operation.

As described in the above-referenced application Ser. No. 11/531,000, a self test is preferably performed on the fault detection and circuit tripping portions of the GFCI device 10. In this example, the self test is preferably performed in two stages, Test A and Test B, and preferably at 1 minute intervals. However, as will be appreciated by one skilled in the art, the microprocessor 104 can be programmed to perform testing at any interval of time. A continuity test is included with Test A. The continuity test is first performed on the solenoid 50. Specifically, during a positive half cycle of a sinusoid, the solenoid 50 conducts and charges capacitor C5. During the negative half cycle of the sinusoid, the capacitor C5 discharges. The discharge of capacitor C5 is detected by the microprocessor 104 via pin 118. If there is no discharge on capacitor C5, it indicates that the solenoid 50 is defective because the solenoid 50 did not allow capacitor C5 to charge. Thus, for the continuity test, the continuity of the solenoid is tested via the discharge of capacitor C5.

During Test A, the microprocessor 104 communicates a signal, which is preferably less than 2.0 ms to the transistor 70 via pin 106 on a negative half sinusoid near the middle of the half sinusoid. The transistor 70 is activated and provides a signal on conductor 69, which creates an imbalance in sensing transformer 68A. The imbalance is detected by GFCI chip 100, and the GFCI chip 100 provides a 0.5 ms trip signal on pin 102 which is detected by the microprocessor 104 via pin 112. Pin 112 of the microprocessor 104 is preferably an analog I/O. Resistor R5, which is in series with the pin 112 of the microprocessor 104, allows capacitor C2 to be monitored. Specifically, when the signal is output from pin 102 of the GFCI chip 100, the charge on capacitor C2 rises. The test signal is preferably short and completed during a negative half cycle of a sinusoid to prevent current in the sinusoid 50 and thereby avoid tripping the contacts 45, 46, 47 and 48. The microprocessor 104 detects the GFCI chip's trip signal in order to verify that the GFCI chip 100 is operating normally. It should be appreciated by those skilled in the art that the embodiment of the present invention can be practiced without the continuity test for Test A.

It should be noted that in an embodiment of the present invention, the I/O of microprocessor 104 preferably comprises a 10 bit I/O providing 3.2 mv per bit accuracy or 31 bits for 0.1 v. The sampling rate of the microprocessor 104 is ~15 µs at an internal oscillator frequency of 4 MHz (8 $T_{OSC}$) and 15 µs×31 bits 0.46 ms. The 2.5 k ohm minimum recommended analog source requirement is met since capacitor C2 has a low source resistance (ESR) and is charged by GFCI chip 100.

It should be noted that during Test A, if the GFCI chip 100 cannot provide an output signal to open the contacts 45, 46, 47 and 48, the microprocessor 104 will activate SCR 51 and energize the solenoid 50 to open the contacts 45, 46, 47 and 48. The user can reset the GFCI device 10 to restore power to the load terminals. However, the microprocessor 104 will no longer send a signal to open the contacts 45, 46, 47 and 48.

The second phase of self testing is referred to herein as Test B. Test B tests the operability of SCR 51 and includes the test for the continuity of solenoid 50 via pin 118 of the microprocessor 104. Specifically, during a positive half cycle of a sinusoid, the solenoid 50 conducts and charges capacitor C5. During the negative half cycle of the sinusoid, the capacitor C5 discharges. The discharge of capacitor C5 is detected by the microprocessor 104 via pin 118. If there is no discharge on capacitor C5, it indicates that the solenoid 50 is defective because the solenoid 50 did not allow capacitor C5 to charge. Thus, for the continuity test, the continuity of the solenoid is tested via the discharge of capacitor C5. Next, the capacitor C2 is quick charged via a 0.5 ms pulse on pin 112 of the microprocessor 104. The 0.5 ms pulse is asserted high 12 ms after the zero crossing at the start of the positive half sinusoid. That is, Test B is preferably initiated only on the negative half sinusoid. The charge on capacitor C2 activates SCR 51 about 0.4 ms from the zero crossing, which is far away from the energy necessary to open contacts 45, 46, 47 and 48. The microprocessor 104 will then detect via pin 118 whether capacitor C5 discharges through the SCR 51 in order to determine if the SCR 51 is operating normally. It should be appreciated by those skilled in the art that the embodiment of the present invention can be practiced without the continuity test for Test B.

The GFCI device 10 determines that the one minute periodic test failed, the one minute test can be repeated, preferably eight times, and if the test fails each time, the GFCI device 10 can be declared as non-operational. As previously described, the red LED 44B will flash. The GFCI device 10 allows a user to reset the GFCI device 10 to function in an unprotected receptacle mode, if the GFCI device 10 is determined to be non-operational. The red LED 44B will then flash to indicate that the GFCI device 10 is not providing ground fault protection.

It should be noted that if the GFCI device 10 is determined to be nonfunctional, and operates in a receptacle mode of operation, the self tests are prevented from occurring. The microprocessor 104 flashes the red LED 44B via pin 108.

The power/alarm indicator 44 will now be described. It should be noted that the GFCI chip 100 preferably includes a regulator 126 that provides a dual function. The regulator can be, but is not limited to, a low dropout regulator (LDO) such as MCP1700 available from Microchip located in Chandler, Ariz. One function is to power the internal circuitry of the GFCI chip 100. The second function is to power circuitry external to the GFCI chip 100 (such as Green LED 44A and microprocessor 104). The green LED 44A illuminates during normal operation of the GFCI receptacle 10. The red LED 44B is illuminated solid if contacts 45, 46, 47 and 48 have been tripped and the green LED 44A is extinguished. However, the red LED 44B flashes to indicate that the GFCI receptacle 10 is not providing ground fault protection if any of the self tests have failed.

When ground fault (GF) current levels vary around the GFCI GF current threshold, intermittent GFCI chip 100 outputs can occur. These intermittent outputs may have sufficient energy to turn the SCR 51 on and, at the same time, result in insufficient energy in the solenoid coil 50 to open the contacts 45, 46, 47 and 48. Thus, it is possible for the microprocessor 104 to make a false EOL determination. When the GFCI chip 100 output signal occurs at a random time (i.e., not during the typical 8 millisecond duration of a self test), then the microprocessor 104 uses this information to differentiate this signal from a GFCI chip 100 output signal produced by the internal self test function described above. If the mechanics of the GFCI device 10 are not working (e.g., the contacts 45, 46, 47 and 48), the optocoupler 71 will not provide a "contacts open" signal to the microprocessor 104.

For GF current levels above the GFCI device 10 GF current threshold, the GFCI ship 100 output signal will produce SCR gating or turn on signals on each successive positive half sinusoid that are hereinafter referred to as pulses. The microprocessor 104 is preferably programmed to count the SCR pulses. When the microprocessor 104 counts a selected number of consecutive SCR 51 turn on signals (e.g., 10 consecutive SCR turn on signals) and the contacts 45, 46, 47 and 48 remain closed, the microprocessor is programmed to declare the EOL of the GFCI device 10 and flash the red LED 44B preferably permanently (e.g., store the EOL status and LED 44B state in permanent microprocessor memory). Thus, this method prevents a false EOL determination from being caused by intermittent GFCI chip 100 output signals that may or may not produce sufficient solenoid coil power to trip the latching plate 54 and open the contacts 45, 46, 47 and 48.

The microprocessor 104 can also be programmed to monitor the SCR 51 anode and count pulses at the SCR anode (e.g., monitor the leading edges of the sinusoid pulses whereby the gate voltage turns on and then drops to 0 volts). As ground leakage increases, intermittent pulses from the GFCI chip 100 become more common. If the pulses occur on the negative half sinusoid, the microprocessor 104 may declare a false EOL. Thus, the microprocessor 104 is programmed to count the pulses on the positive half sinusoid only. As with the above-described operation involving monitoring of the SCR 51 gate, the selected number of consecutive pulses that need to be counted while the contacts remain closed to declare EOL can be predetermined and can be any one of a plurality of integer values.

In addition, the microprocessor 104 can be programmed to monitor both the SCR 51 anode and gate outputs and count corresponding pulses in the determination of EOL. The microprocessor 104 can be programmed to require a selected number of pulses (i.e., on the positive half sinusoid) at both the SCR 51 anode and gate to be counted while the contacts are closed before declaring EOL. Alternatively, the microprocessor 104 can be programmed to require a selected number of pulses (i.e., on the positive half sinusoid) at either the SCR 51 anode or gate to be counted while the contacts are closed before declaring EOL. Further, the microprocessor 104 can be programmed to require a selected number of pulses (i.e., on the positive half sinusoid) to occur at one of the SCR 51 anode or gate before the other, while the contacts remain closed, before declaring EOL.

In accordance with exemplary embodiments of the present invention, as will now be described, an EOL indicator for a GFCI device 10 is provided even in the event of a shorted diode bridge. Further, a device is provided for removing power from the GFCI device 10 face receptacle contacts and load terminals when EOL occurs.

As stated previously, when a diode bridge 72 is used to provide power to the GFCI chip 100 and related circuitry (e.g., SCR 51, and solenoid 50) and to the self test circuitry (e.g., microprocessor 104, LEDs and so on), a shorted diode bridge can result in a failure to generate an EOL indication. For example, a shorted diode bridge 72 can result in an opening of a track on the printed circuit board (PCB) of the GFCI device, thereby undesirably removing power from the core GFCI components and the self-test circuit components described above in connection with FIG. 3. The present invention solves this potential problem by providing a separate pathway for supplying power to the self test circuitry apart from the full wave rectified power provided via the bridge diode 72 to other GFCI device 10 components. Power can therefore be provided to the self test circuitry even in the event of a shorted diode bridge 72.

In accordance with an exemplary embodiment of the present invention, a half-wave rectified power supply comprising diodes 120 and 128, as shown in FIG. 3, is provided to supply power to the self test circuitry (e.g., microprocessor 104, LED 44 and so on), even when the diode bridge shorts 72 and a PCB track opening results. The diode 120 is provided in a conductive path 130 extending from the hot conductor 66. Unlike the hot conductor 66, the conductive path 130 does not pass through the magnetic cores 67A and 67B of the two transformers 68A and 68B, respectively. The path comprises the LED 44 and is connected to an input of the regulator 126. The diode 128 is provided between the transient voltage suppressor 73 and ground, and provides a separate track for the self test circuitry return current to neutral when a failure occurs. This return path does not short the negative (−)-to-neutral diode in the diode bridge 72 during normal operation.

Thus, in the event of a shorted diode bridge and any associated PCB track opening, the LED 44 and the regulator 126 continue to receive power from the source 41 via the path 130 which is half wave rectified via the diode 120. When a bridge diode shorts, R17 (FI) opens, the GFCI chip 100 loses power, the 'A' Test performed by GP0 fails, and the Red LED 44B flashes via GP5 of the microprocessor 104. If a shorted bridge causes a track opening, the 'A' Test performed by GP0 fails and the Red LED flashes via GP5. The self test (ST) circuit has parallel tracks, so that a failure of the core GFCI circuit bridge track will not remove the ST circuit from operation. Accordingly, the microprocessor 104, which receives power from the regulator 126 via pin 114 continues to operate, that is, perform self testing and control EOL annunciation, among other operations.

The half-wave bridge comprising at least diode 120 preferably derives its power from a heavy PCB track typically present on a GFCI device's PCB where the line hot and neutral lines first make connection to the PCB. Thus, when the failures described above cause one or more PCB tracks on the GFCI device 10 to open, this alternate path for power to the self testing circuitry remains intact, allowing the self testing circuitry to flash a red LED 44B to indicate EOL. In FIG. 3, a "*" symbol is indicated in three locations in the schematic which represent where PCB track has fused open when either the SCR 51 was on continuously or a bridge diode 72 was shorted.

In addition, a fuse resistor 124 is connected between the diode bridge 72 and line terminal 39 to maintain the GFCI device self test circuitry and allow the microprocessor to declare EOL in the event of a shorted diode bridge 72. By way of examples, the fuse resistor 124 can serve two significant purposes. First, when a diode shorts in the bridge diode 72, the fuse resistor 124 can open before PCB track currents can result in an open trace on the PCB, thereby avoiding a loud noise (e.g., "pop" sound) when a track opens. Second, the fuse resistor 124 can also open before a PCB track opening caused by a short in the SCR 51. For example, if a collector to emitter short occurs in the SCR 51 and the SCR stays on, the solenoid 50 can short, causing the diode D2 to short. This situation can, in turn, cause the bridge diodes 72 to short. The fuse resistor 124 will then open and prevent opening of the hot or neutral conductors 66 and 64 and the associated loud "pop" sound. The fuse resistor 124 can also prevent opening of the double feedthrough in series with the solenoid coil 50, or the double feedthrough in series with the neutral bridge lead, which is represented by the "*" at the bottom of the bridge 72 in FIG. 3.

A resister R13 is provided to limit current and therefore power to the self test (ST) circuit. In existing GFCI devices that provide no separate power path for self test circuitry, a resister R13 of about 47 kilo ohms (kΩ) is connected to the positive (+) terminal of the diode bridge 72 for full wave bridge output. With continued reference to FIG. 3, this resister R13 is instead placed on the line hot side of the bus bar and connected through diode 120 to use half wave current via R13 and isolate the ST circuit power supply. The size of the resister R13 is reduced (e.g., preferably to 24.3 kΩ) from existing GFCI devices to allow more current to provide the same power requiements.

In accordance with another exemplary embodiment of the present invention, a thermal fuse 122 is provided for removing power from face receptacle contacts and load terminals of the GFCI device 10 when EOL occurs. The thermal fuse is preferably provided in the hot conductor 66, although it can be placed in other conductive paths of the GFCI device 10 shown in FIG. 3. A resistive component is preferably positioned to be in contact with or proximal to the thermal fuse 122, and to open the thermal fuse 122 when the resistive device generates heat. By way of an example, the thermal fuse is configured to open when the temperature of the thermal fuse reaches its specified value such as 100 degrees Centigrade. The resistive component 132 (e.g., a resistor) preferably derives power from the line voltage via the hot conductor 66. The resistive component 132 is preferably connected to the microprocessor 104 via one of its input/outputs (I/Os) by a semiconductor device such as an SCR, transistor circuit, and the like, which applies voltage across the resistive component 132. The voltage across the resistive component 132 causes its surface temperature to increase rapidly and to increase the surface temperature of the thermal fuse 122 to a temperature at which the thermal fuse opens. Thus, the microprocessor 104 can be programmed to generate an output to apply the voltage across the resistive component 132 when EOL is detected, thereby removing power from face receptacle contacts and load terminals of the GFCI device 10.

By way of an illustrated example, microcontroller 104 pin GP3 can serve a dual function. During Production, Test Q3-G is disabled when the test fixture shorts the gate to circuit ground, to prevent current in the heating element. Applying 13 V on GP3 then initiates internal self test software as currently performed on Production ST GFCI's. When the ST GFCI reaches EOL, GP3 is asserted high to supply half wave current to the heating element which causes the thermal fuse to open. The heating element can be a specially designed part that closely couples the heating element to the thermal fuse or it can be separately purchased parts that complement one another for thermal activation of the fuse.

As stated above, the thermal fuse 122 and resistive element circuit of the present invention opens the fuse using good heat transfer initiated by a microprocessor-generated output, as opposed to the amount of current through the thermal fuse 122 as with conventional thermal fuses. The thermal fuse 122 is illustrated as connected to the hot conductor 66; however, the thermal fuse 122 can alternatively be coupled to the solenoid 50, a PCB trace, a semiconductor part or other circuit element that reaches a selected temperature at EOL.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and following claims.

What is claimed is:

1. A fault detector comprising:
   line side terminals for receiving an input power signal;
   load side terminals for connecting to a load;
   hot and neutral conductors for connecting respective line side terminals to corresponding load side terminals;
   a ground fault circuit interrupter circuit for detecting faults and controllably operating at least one switching device to open at least one of the hot and neutral conductors upon detection of a fault;
   a processing device connected to the ground fault circuit interrupter circuit for performing self-test operations to determine if the ground fault circuit interrupter circuit is malfunctioning;
   an end of life (EOL) indicator controllably operated by the processing device to indicate end of life of the fault detector;
   a full wave rectifier diode bridge connected across the hot and neutral conductors for supplying a rectified power signal to the ground fault circuit interrupter circuit; and
   a secondary power supply circuit connected to the hot and neutral conductors for providing power to the processing device and the EOL indicator;
   wherein the secondary power supply circuit is a half wave rectified power supply; and
   wherein the fault detector comprises a voltage regulator having an output connected to the processing device, and wherein the half wave rectified power supply comprises a conductive path extending from the hot conductor to an input of the voltage regulator, and a diode serially connected to the conductive path.

2. A fault detector as claimed in claim 1, wherein the half wave rectified power supply diode is connected to the conductive path proximally to where the hot conductor receives power from an AC power source connected to the line terminals.

3. A fault detector as claimed in claim 1, wherein the EOL indicator is connected to the conductive path of the half wave rectified power supply.

4. A fault detector as claimed in claim 1, wherein the secondary power supply circuit comprises a diode connected to the neutral conductor to provide a path separate from the neutral conductor for the processing device to return current to neutral when at least one of the ground fault circuit interrupter circuit and the full wave rectifier diode bridge malfunctions.

5. A fault detector as claimed in claim 1, further comprising a fuse resistor connected between the hot conductor and a line input of the full wave rectified diode bridge.

6. A fault detector as claimed in claim 1, further comprising a thermal fuse connected in series with the hot conductor, and a heat-conducting device connected to the processing device to receive an output therefrom and disposed proximally to the thermal fuse, the processing device being operable to apply a voltage across the heat-conducting device to cause its surface temperature to increase and thereby increase the surface temperature of the thermal fuse to a temperature at which the thermal fuse opens when the processing device determines end of life of the fault detector.

7. A fault detector as claimed in claim 6, wherein the heat-conducting device comprises at least one of a resistive element, a solenoid, a printed circuit board trace, and a semiconductor part, and is characterized by reaching a selected temperature at EOL.

8. A fault detector as claimed in claim 6, wherein the heat-conducting device is connected to the processing device via at least one of a silicon controlled rectifier (SCR), a transistor circuit and an electronic gating device.

9. A fault detector comprising:
line side terminals for receiving an input power signal;
load side terminals for connecting to a load;
hot and neutral conductors for connecting respective line side terminals to corresponding load side terminals;
a ground fault circuit interrupter circuit for detecting faults and controllably operating at least one switching device to open at least one of the hot and neutral conductors upon detection of a fault;
a processing device connected to the ground fault circuit interrupter circuit for performing self-test operations to determine if the ground fault circuit interrupter circuit is malfunctioning;
an end of life (EOL) indicator controllably operated by the processing device to indicate end of life of the fault detector;
a full wave rectifier diode bridge connected across the hot and neutral conductors for supplying a rectified power signal to the ground fault circuit interrupter circuit;
a secondary power supply circuit connected to the hot and neutral conductors for providing power to the processing device and the EOL indicator; and
a regulator having an output connected to the processing device, wherein the secondary power supply circuit comprises a conductive path extending from a hot conductor node to an input of the voltage regulator, the hot conductor node also being connected to the hot conductor and a line input of the full wave rectified diode bridge.

10. A fault detector as claimed in claim 9, wherein the secondary power supply circuit comprises a half wave rectified power supply diode serially connected to the conductive path.

11. A fault detector as claimed in claim 9, wherein the half wave rectified power supply diode is connected to the conductive path proximally to where the hot conductor receives power from an AC power source connected to the line terminals.

12. A fault detector as claimed in claim 9, wherein the secondary power supply circuit comprises a diode connected to the neutral conductor to provide a path separate from the neutral conductor for the processing device to return current to neutral when at least one of the ground fault circuit interrupter circuit and the full wave rectifier diode bridge malfunctions.

13. A fault detector as claimed in claim 9, further comprising a fuse resistor connected between the hot conductor and the line input of the full wave rectified diode bridge.

14. A fault detector as claimed in claim 9, further comprising a thermal fuse connected in series with the hot conductor, and a heat-conducting device connected to the processing device to receive an output therefrom and disposed proximally to the thermal fuse, the processing device being operable to apply a voltage across the heat-conducting device to cause its surface temperature to increase and thereby increase the surface temperature of the thermal fuse to a temperature at which the thermal fuse opens when the processing device determines end of life of the fault detector.

15. A fault detector as claimed in claim 14, wherein the heat-conducting device comprises at least one of a resistive element, a solenoid, a printed circuit board trace, and a semiconductor part, and is characterized by reaching a selected temperature at EOL.

16. A fault detector as claimed in claim 14, wherein the heat-conducting device is connected to the processing device via at least one of a silicon controlled rectifier (SCR), a transistor circuit and an electronic gating device.

* * * * *